(12) United States Patent
Thiel

(10) Patent No.: US 8,282,321 B2
(45) Date of Patent: Oct. 9, 2012

(54) CHUCK LEVER FOR A DRILL

(75) Inventor: Steven F. Thiel, Colgate, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 887 days.

(21) Appl. No.: 12/399,819

(22) Filed: Mar. 6, 2009

(65) Prior Publication Data

US 2009/0302554 A1    Dec. 10, 2009

Related U.S. Application Data

(60) Provisional application No. 61/034,809, filed on Mar. 7, 2008.

(51) Int. Cl.
*B23B 31/10* (2006.01)

(52) U.S. Cl. ............................ 408/124; 279/62; 279/150

(58) Field of Classification Search .................. 279/150, 279/61, 62, 147, 148; 408/124
See application file for complete search history.

(56) References Cited

U.S. PATENT DOCUMENTS

| 206,320 | A | | 7/1878 | Hayden |
|---|---|---|---|---|
| 2,826,950 | A | | 3/1958 | McClintock |
| 3,354,757 | A | | 11/1967 | Grimm et al. |
| 4,317,578 | A | * | 3/1982 | Welch .............................. 279/60 |
| 4,460,296 | A | * | 7/1984 | Sivertson, Jr. ................ 408/124 |
| 4,532,834 | A | | 8/1985 | Hartman |
| 4,968,194 | A | | 11/1990 | Considine |
| 5,011,343 | A | * | 4/1991 | Saban et al. .................. 408/240 |
| 5,332,240 | A | | 7/1994 | Bedoian |
| 5,810,525 | A | | 9/1998 | Ector, Sr. |
| 5,813,805 | A | | 9/1998 | Kopras |
| 5,816,584 | A | | 10/1998 | Miles et al. |

* cited by examiner

*Primary Examiner* — Daniel Howell
*Assistant Examiner* — Michael Vitale
(74) *Attorney, Agent, or Firm* — Michael Best & Friedrich LLP

(57) ABSTRACT

A chuck, adapted to secure a power tool bit to a power tool, includes an output operably coupled to a motor to receive torque from the motor. The output at least partially supports therein the power tool bit. The chuck also includes an outer body having a cavity and rotatable relative to the output, and a lever coupled to the outer body and movable between a first position, in which the lever is at least partially retracted into the cavity, and a second position, in which the lever is extended from the cavity.

20 Claims, 1 Drawing Sheet

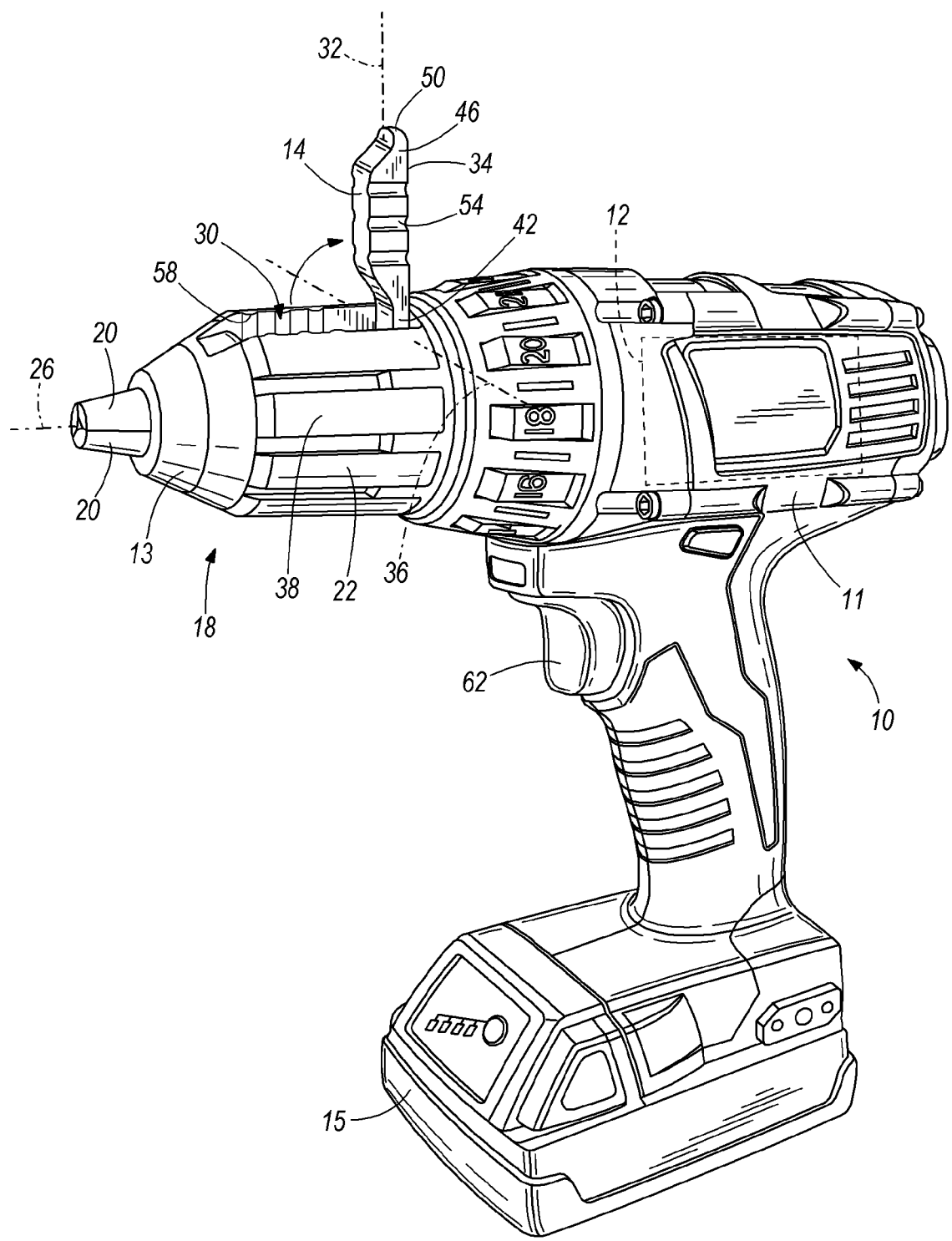

US 8,282,321 B2

CHUCK LEVER FOR A DRILL

RELATED APPLICATIONS

This application claims priority to U.S. Provisional Patent Application Ser. No. 61/034,809 filed on Mar. 7, 2008, the entire content of which is incorporated herein by reference.

BACKGROUND OF THE INVENTION

The present invention relates generally to power tools, and more particularly to keyless chucks for power tools.

Keyless chucks are typically used with power tools to facilitate the exchange of tool bits for use with the power tool. When used with a drill, for example, an operator of the drill would switch the motor to reverse, grasp the outer body of the keyless chuck, and activate the motor by depressing a trigger. The resulting relative rotation between the chuck outer body and the jaws between which the tool bit is secured causes the jaws to disengage the tool bit and retract into the chuck outer body. To tighten the keyless chuck after the tool bit has been removed and replaced with another tool bit, the operator of the power tool would switch the motor to the forward direction, grasp the chuck outer body, and pull the trigger to activate the motor. The resulting relative rotation between the chuck outer body and the jaws causes the jaws to extend from the chuck outer body and engage the tool bit.

SUMMARY OF THE INVENTION

The present invention provides, in one aspect, a chuck adapted to secure a power tool bit to a power tool. The chuck includes an output operably coupled to a motor to receive torque from the motor. The output at least partially supports therein the power tool bit. The chuck also includes an outer body having a cavity and rotatable relative to the output, and a lever coupled to the outer body and movable between a first position, in which the lever is at least partially retracted into the cavity, and a second position, in which the lever is extended from the cavity.

The present invention provides, in another aspect, a power tool including a housing, a motor supported by the housing, and an output coupled to the motor to receive torque from the motor. The output at least partially supports therein a power tool bit. The power tool also includes a chuck operable to secure the power tool bit to the output. The chuck includes an outer body having a cavity and rotatable relative to the output, and a lever coupled to the outer body and movable between a first position, in which the lever is at least partially retracted into the cavity, and a second position, in which the lever is extended from the cavity.

Other features and aspects of the invention will become apparent by consideration of the following detailed description and accompanying drawings.

BRIEF DESCRIPTION OF THE DRAWINGS

FIG. 1 is a perspective view of a power tool including an integrated chuck lever, shown in an actuated position, according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIG. 1 illustrates a power tool 10 including a housing 11, a motor 12 supported by the housing 11, and an output 13 operably coupled to the motor 12 to receive torque from the motor 12. The illustrated power tool 10 includes an on-board power source (e.g., a battery 15) to provide power to the electric motor 12. Alternatively, the power tool 10 may include a power cord to transfer power from a household power source (e.g., an electrical outlet) to the electric motor 12. As a further alternative, the motor 12 may utilize a different power source (e.g., pressurized gas or liquid) for operation. With continued reference to FIG. 1, the power tool 10 is configured as a hand-held drill 10. Alternatively, the power tool 10 may be configured as a different type of tool (e.g., a right-angle drill, a grinder, etc.).

The drill 10 includes a keyless chuck 18, having an integrated chuck lever 14, for clamping or securing a drill accessory (e.g., a drill bit; not shown) to the drill 10. The chuck 18 includes the drill output 13 (e.g., a spindle), a plurality of jaws 20 movable relative to the output 13 between retracted and extended positions, and a generally cylindrical body 22 surrounding the output 13 that rotates relative to the output 13 about a rotational axis 26 of the motor 12 to increase or decrease the clamping force exerted by the jaws 20 on the drill accessory. Specifically, each of the jaws 20 includes an outer surface, at least a portion of which is threaded, and the chuck body 22 includes an inner surface having threads thereon. The threads on the inner surface of the chuck body 22 engage the threads on the outer surface of each of the jaws 20. As such, rotation of the chuck body 22 relative to the output 13, in one direction, causes the jaws 20 to retract into the output 13 and the chuck body 22 to release the drill accessory. Rotation of the chuck body 22 relative to the output 13 in an opposite direction causes the jaws 20 to extend from the output 13 and the chuck body 22 to clamp the drill accessory. In other embodiments, the drill 10 may include a keyed chuck.

With continued reference to FIG. 1, the chuck lever 14 is movable between a first or retracted position, in which the chuck lever 14 is received within a cavity 30 in the chuck body 22, and a second or extended position, in which the lever 14 (i.e., a longitudinal axis 32 of the lever 14) is oriented substantially normal to the rotational axis 26 of the motor 12. When recessed, an outer surface 34 of the chuck lever 14 conforms to the contours of an exterior surface 38 of the chuck body 22. Alternatively, a portion of the lever 14 may extend beyond the contour of the exterior surface 38 of the chuck body 22.

The chuck lever 14 includes a first end 42 and a distal second end 46. The first end 42 of the chuck lever 14 is pivotably or hingedly coupled to the chuck body 22 by a hinge pin (not shown), such that the chuck lever 14 is able to pivot between the first or retracted position and the second or extended position (as shown in FIG. 1). The first end 42 of the chuck lever 14 is pivotably coupled to the chuck body 22 about a pivot axis 36 oriented substantially normal to the rotational axis 26 of the motor 12, such that an operator of the drill 10 may grasp the lever 14 and exert a torque on the chuck body 22 about the rotational axis 26 without concern for the lever 14 inadvertently retracting into the cavity 30. The second end 46 includes a tab 50 for an operator to engage or grasp and pivot the chuck lever 14 between the first and second positions.

Alternatively, the chuck lever 14 may be pivotably coupled to the chuck body 22 in other ways, such as a living hinge manufactured, for example, using an injection molding process.

The chuck lever 14 is positively snapped or releasably secured within the cavity 30 of the chuck body 22 to prevent the chuck lever 14 from centrifugally opening during operation of the drill 10. Various structure may be used to positively snap-fit or retain the chuck lever 14 within the chuck body 22 (i.e., in the first or retracted position). For example, the chuck lever 14 may be held in the first position through the engagement of grooves 54 on the chuck lever 14 and respective protrusions 58 within the cavity 30 until the operator grasps the second end 46 and pivots the chuck lever 14 out of the cavity 30.

FIG. 1 illustrates the chuck lever 14 in the second position (i.e., the actuated or extended position). When the chuck lever 14 is in the second position, the operator may grasp the chuck lever 14 to rotate the chuck body 22 and the chuck lever 14 about the rotational axis 26. Because the pivot axis 36 is oriented substantially normal to the rotational axis 26, the chuck lever 14 will not inadvertently retract into the cavity 30 of the chuck body 22. The load or torque applied by the operator to rotate the chuck lever 14 and the chuck body 22 may either tighten or loosen the jaws 20 around the drill accessory, as described above, depending on the direction of the applied load or torque. Alternatively, the operator may grasp the chuck lever 14 and activate the motor 12 by depressing a trigger switch 62, such that the relative rotation between the output 13 and the chuck body 22 causes the jaws 20 to extend from the output 13 or retract into the output 13, depending on the direction of rotation of the output shaft of the motor 12.

By applying a rotational load or torque to the chuck body 22 via the chuck lever 14, the operator is able to use the lever 14 to increase the amount of leverage on the chuck body 22, and therefore the amount of torque applied to the chuck body 22, when the motor 12 is activated to more tightly secure or clamp the drill accessory between the jaws 20, compared to the amount of leverage available to the operator by directly grasping the chuck body 22. In other words, the chuck lever 14 provides a mechanical advantage for applying rotational loads to the chuck body 22.

Various features of the invention are set forth in the following claims.

What is claimed is:

1. A power tool comprising:
    a housing;
    a motor supported by the housing;
    an output coupled to the motor to receive torque from the motor, the output at least partially supporting therein a power tool bit and defining a rotational axis;
    a chuck operable to secure the power tool bit to the output, the chuck including
        an outer body having a cavity and the outer body being selectively rotatable relative to the output in a first rotatable direction to cause the chuck to secure the power tool bit to the output, and the outer body being selectively rotatable in a second direction to release the power tool bit from the output; and
        a lever coupled to the outer body and rotatable therewith about the rotational axis of the output, wherein the lever is movable between a first position, in which the lever is at least partially retracted into the cavity, and a second position, in which the lever is extended from the cavity.

2. The power tool of claim 1, wherein the lever is pivotably coupled to the outer body.

3. The power tool of claim 1, wherein the lever includes a longitudinal axis oriented substantially normal to the rotational axis of the output when in the second position.

4. The power tool of claim 1, wherein the lever is fully retracted into the cavity when in the first position.

5. The power tool of claim 1, wherein the lever is co-rotatable with the outer body relative to the output.

6. The power tool of claim 1, wherein the lever includes a first end coupled to the outer body and a distal second end.

7. The power tool of claim 6, wherein the first end of the lever is pivotably coupled to the outer body.

8. The power tool of claim 7, wherein the first end of the lever is pivotably coupled to the outer body about a pivot axis oriented substantially normal to the rotational axis of the output.

9. The power tool of claim 6, wherein the distal second end of the lever includes a tab graspable by an operator of the power tool to move the lever from the first position to the second position.

10. The power tool of claim 1, wherein the lever is snap-fit to the outer body.

11. The power tool of claim 1, wherein the power tool is a drill.

12. A chuck adapted to secure a power tool bit to a power tool, the chuck comprising:
    an output operably coupled to a motor to receive torque from the motor, the output at least partially supporting therein the power tool bit and defining a rotational axis;
    an outer body having a cavity and rotatable relative to the output; and
    a lever coupled to the outer body and rotatable therewith about the rotational axis of the output, wherein the lever is movable between a first position, in which the lever is at least partially retracted into the cavity, and a second position, in which the lever is extended from the cavity.

13. The chuck of claim 12, wherein the lever is pivotably coupled to the outer body.

14. The chuck of claim 12, wherein the lever includes a longitudinal axis oriented substantially normal to the rotational axis of the output when in the second position.

15. The chuck of claim 12, wherein the lever is fully retracted into the cavity when in the first position.

16. The chuck of claim 12, wherein the lever is co-rotatable with the outer body relative to the output.

17. The chuck of claim 12, wherein the lever includes a first end coupled to the outer body and a distal second end.

18. The chuck of claim 17, wherein the first end of the lever is pivotably coupled to the outer body.

19. The chuck of claim 18, wherein the first end of the lever is pivotably coupled to the outer body about a pivot axis oriented substantially normal to the rotational axis of the output.

20. The chuck of claim 17, wherein the distal second end of the lever includes a tab graspable by an operator of the power tool to move the lever from the first position to the second position.

* * * * *